Figure 1:
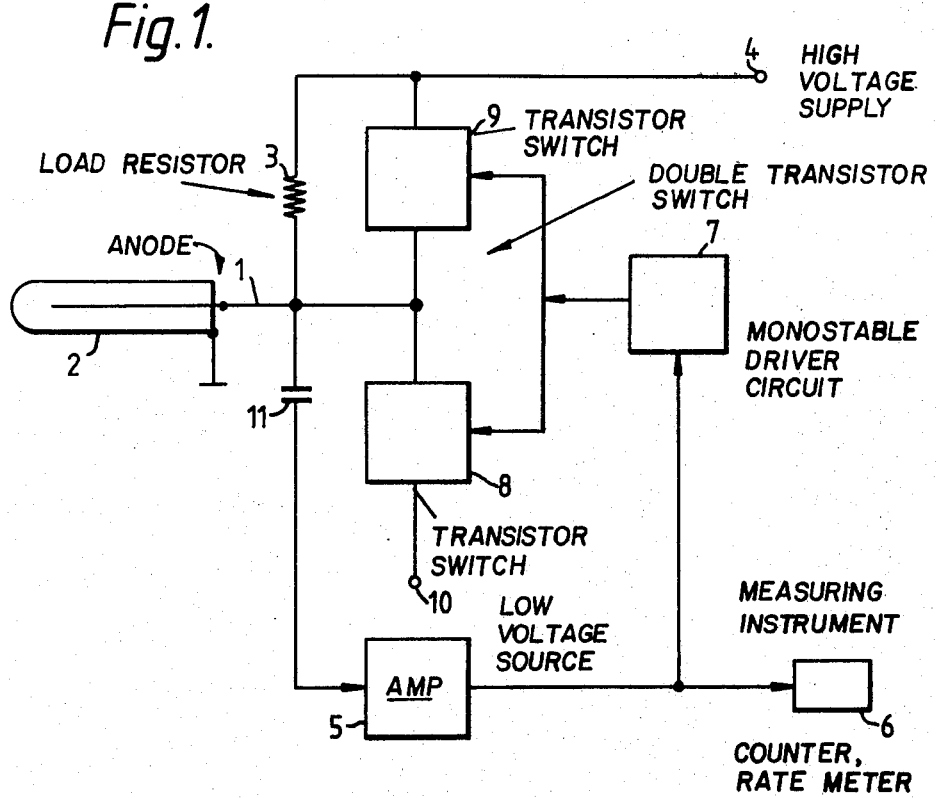

United States Patent [19]

Jackson et al.

[11] 4,453,076
[45] Jun. 5, 1984

[54] METHOD AND APPARATUS FOR REDUCING THE DEAD-TIME OF A GEIGER-MÜLLER, GAMMA-RAY DETECTOR TUBE

[75] Inventors: Kenneth Jackson, Yarm; Nigel P. Pickett, Stockton-on-Tees, both of England

[73] Assignee: Imperial Chemical Industries Limited, London, England

[21] Appl. No.: 286,716

[22] Filed: Jul. 24, 1981

[30] Foreign Application Priority Data

Aug. 7, 1980 [GB] United Kingdom ............... 8025845

[51] Int. Cl.³ ............................................ G01T 1/175
[52] U.S. Cl. .................................. 250/374; 307/597; 328/210; 328/226
[58] Field of Search .................. 250/374; 307/597; 328/210, 226

[56] References Cited

U.S. PATENT DOCUMENTS

| | | | |
|---|---|---|---|
| 3,271,620 | 9/1966 | Webb | 328/210 |
| 3,321,628 | 5/1967 | Webb | 250/374 |
| 3,336,479 | 8/1967 | Blackett | 250/374 |
| 4,292,539 | 9/1981 | Todd | 250/374 |

*Primary Examiner*—John S. Heyman
*Attorney, Agent, or Firm*—Cushman, Darby & Cushman

[57] ABSTRACT

The invention concerns use of a Geiger-Müller tube, gamma-ray detector, specifically, the method and apparatus for reducing the "dead-time" of that detector. The tube's anode is alternately connectable to either a high or low voltage through one of a pair of transistorized switches. The higher voltage is sufficient to permit ionization of the gas in the tube while the lower voltage is too low to sustain ionization. The tube is normally connected to the higher voltage source. The initial ionization of the gas in the tube by gamma-rays produces an initially small voltage drop in the anode voltage which is amplified by an amplifier, the output of which actuates a monostable driven circuit to generate a pulse having a width of 3 to 10 microseconds, preferably 5 to 6 microseconds. The leading edge of that pulse momentarily turns on the transistor switch connecting the anode to the lower voltage so that the potential is lowered thereby draining away energy and inhibiting further ionization. The trailing edge of that pulse reestablishes the higher potential by momentarily switching on the higher voltage transistor switch.

8 Claims, 2 Drawing Figures

METHOD AND APPARATUS FOR REDUCING THE DEAD-TIME OF A GEIGER-MüLLER, GAMMA-RAY DETECTOR TUBE

The present invention relates to an electronic circuit allowing improved operation of Geiger-Müller gamma-ray detectors.

Geig-Müller tubes are used widely to detect X-rays and gamma-rays and they find industrial application in various types of gauges and measuring devices. One of the limitations on the use of Geiger-Müller tubes is the fact that they are unable to respond to the rapid succession of gamma-ray photons which are present in the relatively intense beams which are needed in some applications, for example the most sensitive density gauges. One solution to this problem is to use an ion chamber instead of a Geiger-Müller tube but this is expensive and so an alternative solution was developed several years ago. This involves the use of a so-called "geiger-quench" electronic circuit which increases the detection rate by the Geiger-Müller tube by an order of magnitude or more.

The "geiger-quench" electronic circuit works as follows. When a gamma-ray photon is detected by a normal Geiger-Müller tube system the gas inside the tube is ionised, causing an electric current to flow between the central anode wire and the surrounding metal cathode. The ionisation of the gas persists for about 200 microseconds and no further detection of incoming photons is possible during the period of "dead-time". The quench circuit reduces the "dead-time" by detecting the onset of ionisation and then reducing the anode voltage to prevent further ionisation. The result is that ionisation now persists for less than 10 microseconds and at the end of this period the anode voltage is restored so that further gamma-rays can be detected.

This form of quench circuit has proved to be of considerable benefit in increasing the efficiency of Geiger-Müller tubes although even yet it is not entirely satisfactory. Thus, it employs thermionic valves and such valves have certain drawbacks. For example, it is difficult to make the valves intrinsically safe for use in flammable atmospheres. Solid-state devices (transistors) have been used instead of valves in more recent "geiger-quench" circuits but such circuits did not increase the detection rate of gamma-ray photons, being used to stabilise the "dead-time" at the expense of the detection rate. Moreover these circuits were not suitable for use in flammable atmospheres because of their comparatively large power requirements. We have now devised a useful improvement to the quench circuit, one of whose advantages is to make the circuit suitable for use in flammable atmospheres.

According to the present invention a method for reducing the "dead-time" of a Geiger-Müller tube to below 20 microseconds comprises (1) amplifying the initial fall in the anode voltage of a Geiger-Müller tube caused by a gamma-ray photon penetrating the wall of said tube and ionising the gas therein;

(2) using the thus-amplified signal to switch the voltage on the anode of the Geiger-Müller tube to a lower value whereby to inhibit further ionisation of the gas contained in the tube; and (3) after a short period of time in the range 3 to 10 microseconds, returning the initial higher voltage to the anode of the Geiger-Müller tube.

In a preferred form of the method of this invention, steps (2) and (3) are effected by making use of a pulse of defined width, preferably of less than 10 microseconds and suitably of 5 to 6 microseconds, generated by, for example, a monostable circuit connected via a double-transistor switch to the anode of the Geiger-Müller tube. In this preferred form of the invention the leading edge of the pulse momentarily turns on one transistor switch which is in turn connected to a voltage supply which is much lower than that normally supplied to the anode. The result is that further ionisation of the gas in the Geiger-Müller tube cannot proceed and the Geiger detector is effectively quenched. After a short period of time, typically 5 to 6 microseconds, the trailing edge of the monostable pulse turns on the other transistor switch which is connected to the usual higher voltage supply to the anode. The Geiger-Müller tube is then ready to receive the next gamma-ray photon.

According to a further aspect of the present invention equipment for reducing the "dead-time" of a Geiger-Müller tube comprises in operative combination sources of relatively high and relatively low voltage adapted to be connected to the anode of a Geiger-Müller tube, a monostable circuit connected to each of said voltage sources and comprising a switching system comprising a double-transistor switch enabling either, but not both simultaneously, of said voltage sources to be connected to the anode of said Geiger-Müller tube and an amplifier adapted to be connected between said monostable circuit and the anode of said Geiger-Müller tube.

If desired, one or more Geiger-Müller tubes may be permanently incorporated as part of the equipment of this invention. Further, a complete assembly incorporating the Geiger-Müller tube(s) could be made intrinsically safe by circuit layout design and by encapsulation in a suitable resin.

Figure 2:
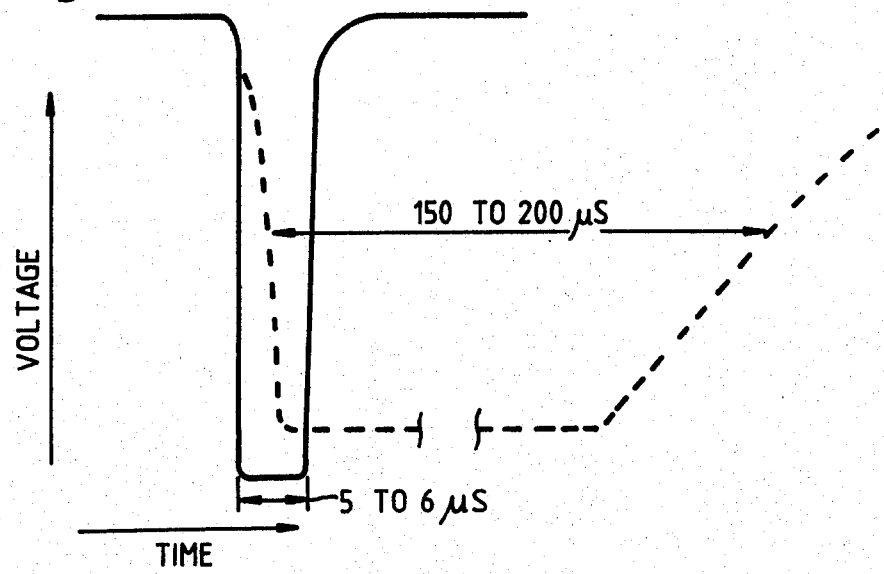

One embodiment of the method and apparatus of the present invention is hereinafter described in more detail with reference to the accompanying drawings in which FIG. 1 is a circuit illustrative of the invention and FIG. 2 is a graph showing the waveform of a Geiger-Müller tube during operation of the method of the invention and, for comparison, during operation of prior art equipment.

Referring to FIG. 1, the anode 1 of a Geiger-Müller tube 2 is connected through a load resistor 3 to a supply 4 of relatively high voltage and, via a capacitor 11 to an amplifier 5. The output from the amplifier 5 is fed to a measuring instrument 6 such as a counter or rate-member and, via a branch connection, to a driver and monostable 7. The monostable 7 is connected to the double-transistor switch 8, 9. Transistor 8 is connected between a source 10 of relatively low voltage and the anode 1, while transistor 9 is connected between the higher voltage source 4 and the anode 1.

In operation, the Geiger-Müller tube is normally connected to the higher voltage source 4. A gamma-ray photon penetrating the wall of the Geiger tube begins ionisation of the enclosed gas and initiates the flow of a small current to the anode 1. At the anode this small current causes a fall in the anode voltage due to the voltage drop in the load resistor 3.

In normal Geiger-Müller tube operation the anode voltage would fall considerably as ionisation increased but in the method and apparatus of this invention the initial small drop in voltage, say of the order of 0.1 or 0.2 volt is amplified through amplifier 5.

On receiving the amplified output the monostable driver circuit 7 produces a pulse of suitable width, say 5 to 6 microseconds. The leading edge of this pulse momentarily turns on transistor switch 8 thereby connecting the anode through transistor 8 to the lower voltage source 10. The voltage produced by low voltage source 10 is deliberately chosen so as to be too low to allow further ionisation of the gas in the Geiger-Müller tube.

Thereafter, the trailing edge of the pulse from the monostable driver circuit 7 momentarily switches on transistor 9 thereby reconnecting the anode 1 to the higher voltage source 4 and placing the Geiger-Müller tube in readiness for receipt of the next gamma-ray photon.

FIG. 2 illustrates the anode wave-form, the full line illustrating operation according to this invention.

In conventional operation, ionisation of the gas in the Geiger-Müller tube causes the initially high anode voltage to fall fairly rapidly and then gradually rise again to its initial high value over a period of 150 to 200 microseconds. This period is the so-called "dead-time" during which the Geiger-Müller tube is unable to count any incoming gamma-ray photons.

In operation according to this invention, the dead-time is limited to a very short period, 5 to 6 microseconds in this example. Use of the monostable driver circuit and the double-transistor switch ensures that the anode voltage is rapidly restored to its normal high level after receipt of a gamma-ray photon.

The use of the double-transistor switches also means that there is only a low current drain from the high voltage supply, thus making it possible to produce a geiger-quench gamma-ray detector which is intrinsically safe electrically, for use in flammable atmospheres.

We claim:

1. A method for reducing the "dead-time" of a Geiger-Müller tube to below 20 microseconds following the initiation of ionization of gas in the tube and an initial drop in anode voltage which comprises the steps of:
    (1) providing sources of relatively high and relatively low voltage;
    (2) amplifying the initial fall in the anode voltage of a Geiger-Müller tube caused by a gamma-ray photon penetrating the wall of said tube and ionising the gas therein;
    (3) using the thus-amplified signal to switch the voltage on the anode of the Geiger-Müller tube to a lower value whereby to inhibit further ionisation of the gas contained in the tube; and
    (4) after a short period of time in the range 3 to 10 microseconds, returning the initial higher voltage to the anode of the Geiger-Müller tube.

2. A method as claimed in claim 1 in which steps (3) and (4) are effected by making use of a pulse of defined width which is less than 10 microseconds.

3. A method as claimed in claim 2 in which the pulse is generated by a monostable circuit connected via a double-transistor switch to the anode of the Geiger-Müller tube, one switch of said double-transistor switch being connected to a supply of relatively high voltage and the other switch being connected to a supply of relatively low voltage.

4. A method as claimed in claim 2 in which the pulse width is in the range 5 to 6 microseconds.

5. Apparatus for reducing the "dead-time" of a Geiger-Müller gamma-ray detection tube having an anode portion comprising: first means to at least momentarily connect a high voltage to said anode to establish a predetermined potential at said anode, second means to at least momentarily connect a low voltage to said anode to establish a lower potential at said anode, amplifier means for generating an amplified output signal in response to an initial voltage drop at said anode, means for generating a control signal in response to said amplified output signal, said control signal means being connected to both said first and second means so that said control signal will at least momentarily actuate said second means to produce a low voltage potential at said anode and after a predetermined delay at least momentarily actuate said first means to reestablish said predetermined potential at said anode.

6. The apparatus as in claim 5 wherein said control signal comprises a pulse wave having leading and trailing edges and a predetermined width, whereby said leading edge at least momentarily actuates said second means and said trailing edge at least momentarily actuates said first means.

7. The apparatus as in claim 5, wherein the predetermined delay of said control signal is from about 3 to about 10 microseconds.

8. The apparatus as in claim 7 wherein, the preferred delay is from about 5 to about 6 microseconds.

* * * * *